United States Patent
Minami

(10) Patent No.: US 8,659,680 B2
(45) Date of Patent: Feb. 25, 2014

(54) IMAGING APPARATUS, IMAGE RECORDING METHOD, AND RECORDING MEDIUM

(75) Inventor: Tsuyoshi Minami, Musashimurayama (JP)

(73) Assignee: Casio Computer Co., Ltd., Tokyo (JP)

(*) Notice: Subject to any disclaimer, the term of this patent is extended or adjusted under 35 U.S.C. 154(b) by 197 days.

(21) Appl. No.: 12/841,203

(22) Filed: Jul. 22, 2010

(65) Prior Publication Data

US 2011/0025885 A1 Feb. 3, 2011

(30) Foreign Application Priority Data

Jul. 31, 2009 (JP) ................................. 2009-178679
Mar. 17, 2010 (JP) ................................. 2010-060096

(51) Int. Cl.
*H04N 5/262* (2006.01)

(52) U.S. Cl.
USPC ........................................................ 348/239

(58) Field of Classification Search
USPC ........................................................ 348/239
See application file for complete search history.

(56) References Cited

U.S. PATENT DOCUMENTS

| 7,587,065 B2* | 9/2009 | Matsumoto et al. | 382/103 |
| 2005/0052551 A1* | 3/2005 | Tsunoda | 348/231.6 |
| 2006/0209087 A1* | 9/2006 | Takeshima et al. | 345/629 |
| 2007/0269119 A1* | 11/2007 | Hyerle et al. | 382/236 |

FOREIGN PATENT DOCUMENTS

| CN | 101472119 A | 1/2009 |
| JP | 2006-005452 A | 1/2006 |
| JP | 2006-238311 A | 9/2006 |
| JP | 2006-345188 A | 12/2006 |

OTHER PUBLICATIONS

Chinese Office Action dated Jun. 5, 2012 and English translation thereof in counterpart Chinese Application No. 201010243995.6.
Chinese Office Action dated Feb. 21, 2013 (and English translation thereof) in counterpart Chinese Application No. 201010243995.6.

* cited by examiner

*Primary Examiner* — James Hannett
(74) *Attorney, Agent, or Firm* — Holtz, Holtz, Goodman & Chick

(57) ABSTRACT

An imaging apparatus, including, an imaging section to image a subject continuously, an image processing section to perform predetermined image processing to a plurality of pieces of image data imaged by the imaging section continuously, a designating section to designate a piece of image data as main image data among the plurality of pieces of image data, and a recording section to record the plurality of pieces of image data subjected to the image processing, and the main image data, as one file.

20 Claims, 11 Drawing Sheets

IMAGING APPARATUS, IMAGE RECORDING METHOD, AND RECORDING MEDIUM

BACKGROUND OF THE INVENTION

1. Field of the Invention

The present invention relates to an imaging apparatus for imaging a subject, an image recording method, and a recording medium.

2. Description of Related Art

Japanese Patent Application Laid-Open Publication No. 2006-345188 discloses the conventionally known technique of generating reduced images from all of a plurality of continuously imaged images to transfer the reduced images to an external device, and of transferring a reduced image selected by a user among the reduced images to the external device as a main image.

Furthermore, Japanese Patent Application Laid-Open Publication No. 2006-5452 discloses the technique of continuously imaging a plurality of images including a moving subject, clipping only a subject image from the plurality of continuously imaged images, and pasting the clipped subject image onto a background image to combine the clipped subject image and the background image. Hereby, a multiple composite image including the pasted subject image, changing sequentially according to time, can be obtained. Hence, since the technique makes it possible to superimpose the trajectory of a continuous movement of an athlete on one image and to display the composite image, for example, the trajectory of the movement of the athlete can be described to be easily understood.

In the case of the technique described in Japanese Patent Application Laid-Open Publication No. 2006-345188, however, since the image selected as the main image and the reduced images are stored in the external device as separate image files, the technique has a problem of the troublesomeness in the management of the image files.

Furthermore, in the case of the technique described in Japanese Patent Application Laid-Open Publication No. 2006-5452, although the technique is useful for understanding the trajectory of a movement of a subject, such as an athlete, the technique has a problem of the difficulty in grasping a region without movements, on the contrary, because the image is a composite image.

SUMMARY OF THE INVENTION

It is, therefore, a main object of the present invention to make it possible to produce continuous shooting images and a multiple composite image having the following advantages: the management of their image files can easily be performed; the situations of the images at the time of photographing them can easily be understood; and a user can precisely understand the transitions of a movement of a subject by a single photographing.

According to a first aspect of the present invention, there is provided an imaging apparatus, including, an imaging section to image a subject continuously, an image processing section to perform predetermined image processing to a plurality of pieces of image data imaged by the imaging section continuously, a designating section to designate a piece of image data as main image data among the plurality of pieces of image data, and a recording section to record the plurality of pieces of image data subjected to the image processing and the main image data, as one file.

According to a second aspect of the present invention, there is provided an image recording method, including the steps of, imaging a subject continuously, performing predetermined image processing to a plurality of pieces of image data imaged continuously at the imaging step, designating a piece of image data as main image data among the plurality of pieces of image data, and recording the plurality of pieces of image data subjected to the image processing, and the main image data, as one file.

According to a third aspect of the present invention, there is provided a recording medium recording computer-readable programs, enabling the computer to functions as, an imaging section to image a subject continuously, an image processing section to perform predetermined image processing to a plurality of pieces of image data imaged by the imaging section continuously, a designating section to designate apiece of image data as main image data among the plurality of pieces of image data, and a recording section to record the plurality of pieces of image data subjected to the image processing, and the main image data, as one file.

BRIEF DESCRIPTION OF THE DRAWINGS

The above and other objects, advantages and features of the present invention will become more fully understood from the detailed description given herein below and the appended drawings which are given by way of illustration only, and thus are not intended as a definition of the limits of the present invention, and wherein.

DESCRIPTION OF THE PREFERRED EMBODIMENTS

First Embodiment

In the following, concrete aspects of the present invention will be described with reference to the accompanying drawings. The scope of the invention is not, however, limited to the shown examples.

Figure 1:
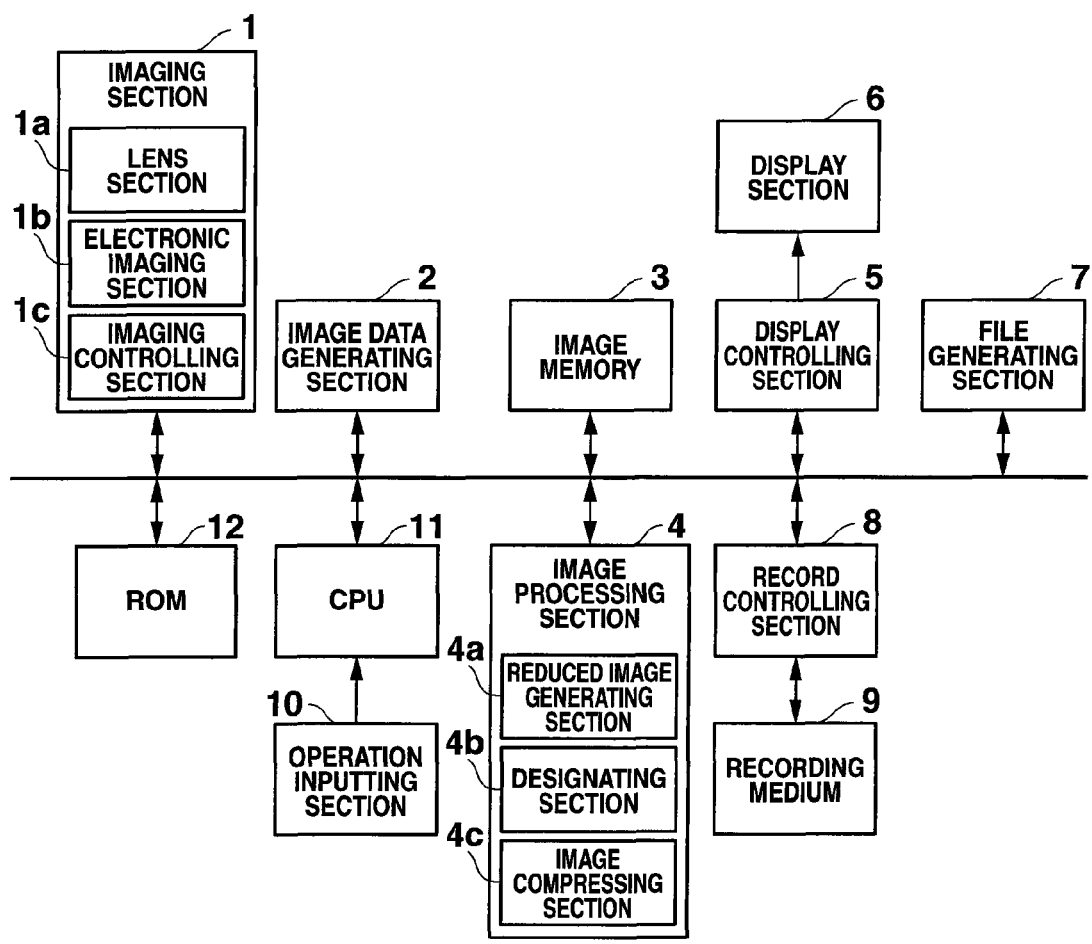
FIG. 1 is a block diagram showing the circuit configuration of an imaging apparatus of a first embodiment of the present invention.

FIG. 1 is a block diagram showing the schematic configuration of an imaging apparatus 100 of the present embodiment, to which the present invention is applied.

The imaging apparatus 100 of the present embodiment generates respective thumbnail images (reduced images) subjected to the reductions of a plurality of still images on the basis of the image data of the plurality of still images, imaged by an imaging section 1 continuously. Furthermore, the imaging apparatus 100 designates any one of the plurality of still images as a main image. Then, the imaging apparatus 100 records the main image and the plurality of thumbnail images in a recording medium 9 with the main image and the thumbnail images related to each other.

To put it concretely, as shown in FIG. 1, the imaging apparatus 100 includes the imaging section 1, an image data generating section 2, an image memory 3, an image processing section 4, a display controlling section 5, a display section 6, a file generating section 7, a record controlling section 8, the recording medium 9, an operation inputting section 10, a central processing unit (CPU) 11, and a read only memory (ROM) 12.

The imaging section 1 is composed of a lens section 1a, an electronic imaging section 1b, an imaging controlling section 1c, and the like.

The lens section 1a is composed of a plurality of lenses, including a zoom lens, a focus lens, and the like. Furthermore, the lens section 1a may includes a zoom driving section for moving the zoom lens into the optical axis direction thereof, a focusing driving section for moving the focus lens into the optical axis direction thereof, and the like at the time of imaging a subject, although their illustration is omitted.

The electronic imaging section 1b is composed of, for example, an image sensor, such as a charge coupled device (CCD) or a complementary metal-oxide semiconductor (CMOS). The electronic imaging section 1b converts an optical image formed by light passing through the various lenses of the lens section 1a into a two-dimensional imaging signal.

The imaging controlling section 1c includes a timing generator, a driver, and the like, although their illustration is omitted. Then, the imaging controlling section 1c drives the electronic imaging section 1b to perform scanning with the timing generator (TG) and the driver, and makes the electronic imaging section 1b convert an optical image into a two-dimensional imaging signal for every predetermined period. Then, the imaging controlling section 1c reads each image frame for one screen from the imaging region of the electronic imaging section 1b to output the read image frame into the image data generating section 2.

Furthermore, the imaging controlling section 1c performs the adjustment controls of imaging conditions, such as automatic exposure (AE) processing, automatic focusing (AF) processing, and automatic white balancing (AWB).

In this manner, the imaging section 1 continuously images a subject at a predetermined frame rate as an imaging section, and sequentially generates a plurality of image frames and obtains them.

The image data generating section 2 generates YUV data of each of the plurality of image frames obtained by a continuous photographing of a subject. Namely, the image data generating section 2 suitably performs the gain adjustment of the analog value signal of each image frame, transferred from the electronic imaging section 1b, for every color component of red (R), green (G), and blue (B) of the signal. After that, the image data generating section 2 performs the sample and hold of the analog value signal with a sample hold circuit (not shown), and converts the analog value signal into digital data with an analog-to-digital (A/D) converter (not shown). Then, the image data generating section 2 performs the color processing including pixel interpolation processing and γ correction processing with a color processing circuit (not shown). After that, the image data generating section 2 generates a luminance signal Y and chrominance difference signals Cb and Cr of digital values (YUV data). The luminance signal Y and the chrominance difference signals Cb and Cr, output from the color processing circuit, are transferred to the image memory 3, used as a buffer memory, by direct memory access (DMA) transfer through a not-shown DMA controller.

The image memory 3 is composed of, for example, a dynamic random-access memory (DRAM). The image memory 3 temporarily stores the data to be processed by, for example, the image processing section 4 and the CPU 11, and the like.

The image processing section 4 includes a reduced image generating section 4a, a designating section 4b, and an image compressing section 4c.

The reduced image generating section 4a reproduces the image data of a still image that has been generated by imaging by the imaging section 1 and is temporarily stored in the image memory 3. Then, the reduced image generating section 4a generates a thumbnail image (reduced image) produced by reducing both the horizontal and vertical sizes of the still image at a predetermined rate on the basis of the reproduced image data. For example, the reduced image generating section 4a generates the thumbnail images by reducing the horizontal and vertical sizes of the reproduced image data of the respective still images at a predetermined rate in the order of a continuous shooting by the imaging section 1, and then, transfers the thumbnail images to the image memory 3.

Hereby, the reduced image generating section 4a functions as a reduced image generating section to generate thumbnail images obtained by severally reducing a plurality of still images on the basis of image data of the plurality of still images imaged by the imaging section 1 continuously.

The designating section 4b designates at least any one still image of a plurality of still images imaged by the imaging section 1 continuously as a main image.

To put it concretely, when a user operates a determining button 10d (described below) of the operation inputting section 10 after selecting and designating a desired thumbnail image (for example, a thumbnail image H2) by operating a selection designating button 10b (described below) of the operation inputting section 10 with a plurality of thumbnail images (for example, 10 thumbnail images) displayed in display section 6, each being in a selectable state (see FIG. 5), then the designating section 4b designates the still image (of the continuous shooting images) corresponding to the desired thumbnail image as a main image.

Hereby, the designating section 4b functions to designate at least any one of a plurality of still images imaged by the imaging section 1 continuously as a main image. To put it concretely, the designating section 4b designates the still image corresponding to a thumbnail image (reduced image) selected with the operating inputting section 10 among the plurality of still images, imaged by the imaging section 1 continuously, as a main image.

The image compressing section 4c compresses the image data of a main image (still image), generated by the image data generating section 2, and the image data of a thumbnail image, generated by the reduced image generating section 4a, by a predetermined coding system (for example, Joint Photographic Experts Group (JPEG) system).

The display controlling section 5 performs the control of reading image data stored in the image memory 3 temporarily to make the display section 6 display the image data.

To put it concretely, the display controlling section 5 includes a video random access memory (VRAM), a VRAM controller, a digital video encoder, and the like. Then, the digital video encoder periodically reads the luminance signal Y and the chrominance difference signals Cb and Cr, read from the image memory 3 and stored in the VRAM (not shown), from the VRAM through the VRAM controller, and generates a video signal on the basis of these pieces data to output the generated video signal to the display section 6 under the control of the CPU 11.

The display section 6 is, for example, a liquid crystal display apparatus, and displays an imaged image and the like on the display screen thereof on the basis of the video signal from the display controlling section 5.

To put it concretely, the display section 6 displays a live view image on the basis of a plurality of image frames produced by the imaging of a subject by the imaging section 1 in an imaging mode, or displays an image imaged as a recording image.

Figure 5:
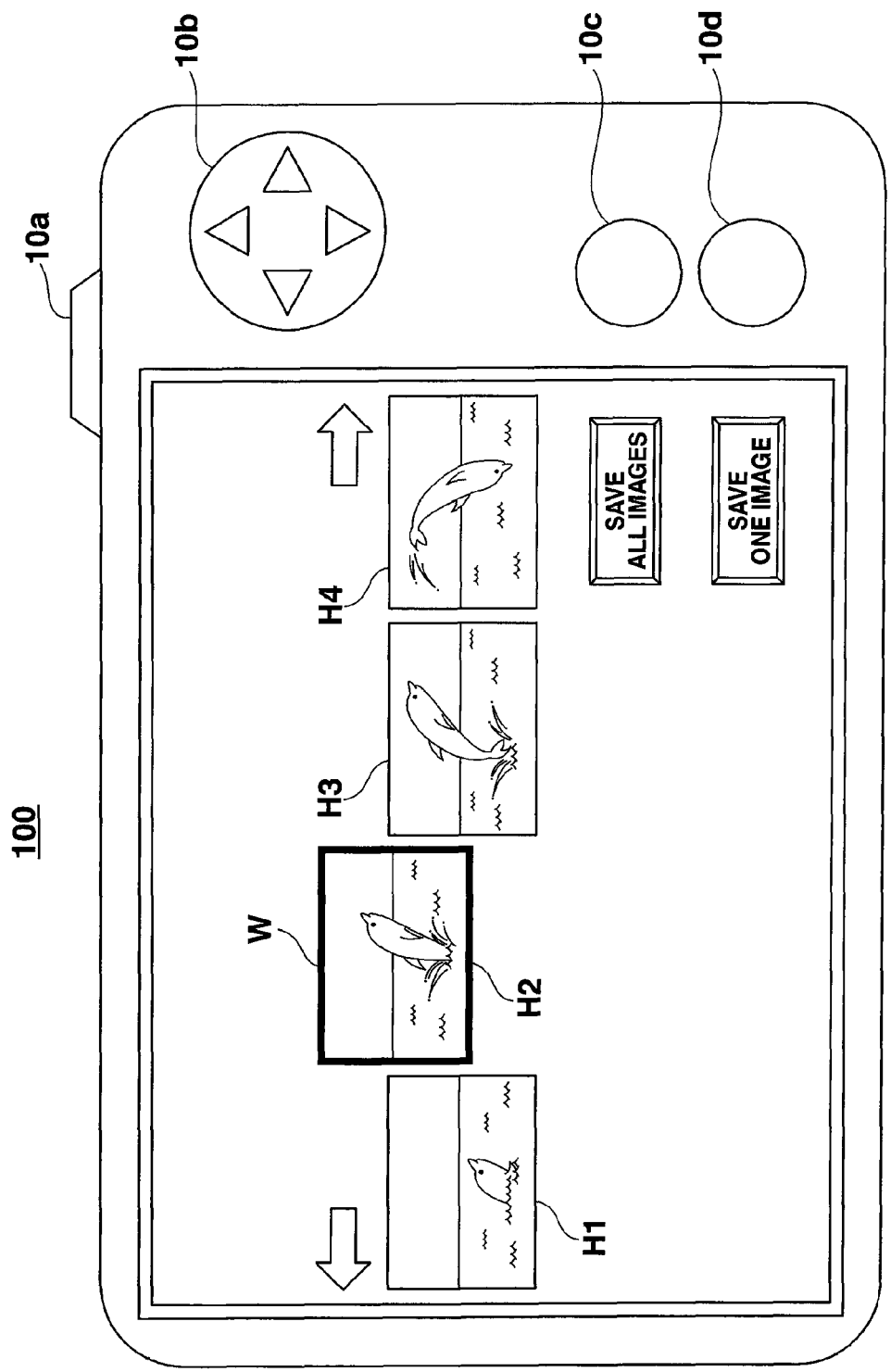
FIG. 5 is a view showing an example of a display state of a display section of the first embodiment.

Furthermore, as a display section, the display section 6 displays thumbnail images generated by the reduced image generating section 4a in a selectable state by a user's predetermined operation of the operation inputting section 10. For example, if a plurality of (for example, 10) still images were imaged in a continuous shooting mode and the thumbnail images corresponding to the respective still images cannot be displayed in a list, then the display section 6 performs a scroll display, changing the content of display by scrolling it to right and left, as shown in FIG. 5. Namely, the display section 6 is configured to enable a user to select the thumbnail images that are not displayed by sequentially scrolling the content of display to right and left on the basis of the user's predetermined operation of the selection designating button 10b.

Furthermore, the display section 6 performs its display with a display frame W superimposed on the edge of one thumbnail image (for example, thumbnail image H2), and displays the thumbnail image with the superimposed display frame W at an upper position than those of the other thumbnail images (for example, thumbnail images H1, H3, and H4) displayed in the display section 6. Hereby, the display section 6 is configured to show that the thumbnail image displayed with the display frame W superimposed thereon is selected by the user.

The file generating section 7 generates one image file F (see FIG. 4), including a main image designated by the designating section 4b among a plurality of still images continuously imaged by the imaging section 1 and the respective thumbnail images of the plurality of still images, as a file generating section.

Figure 4:
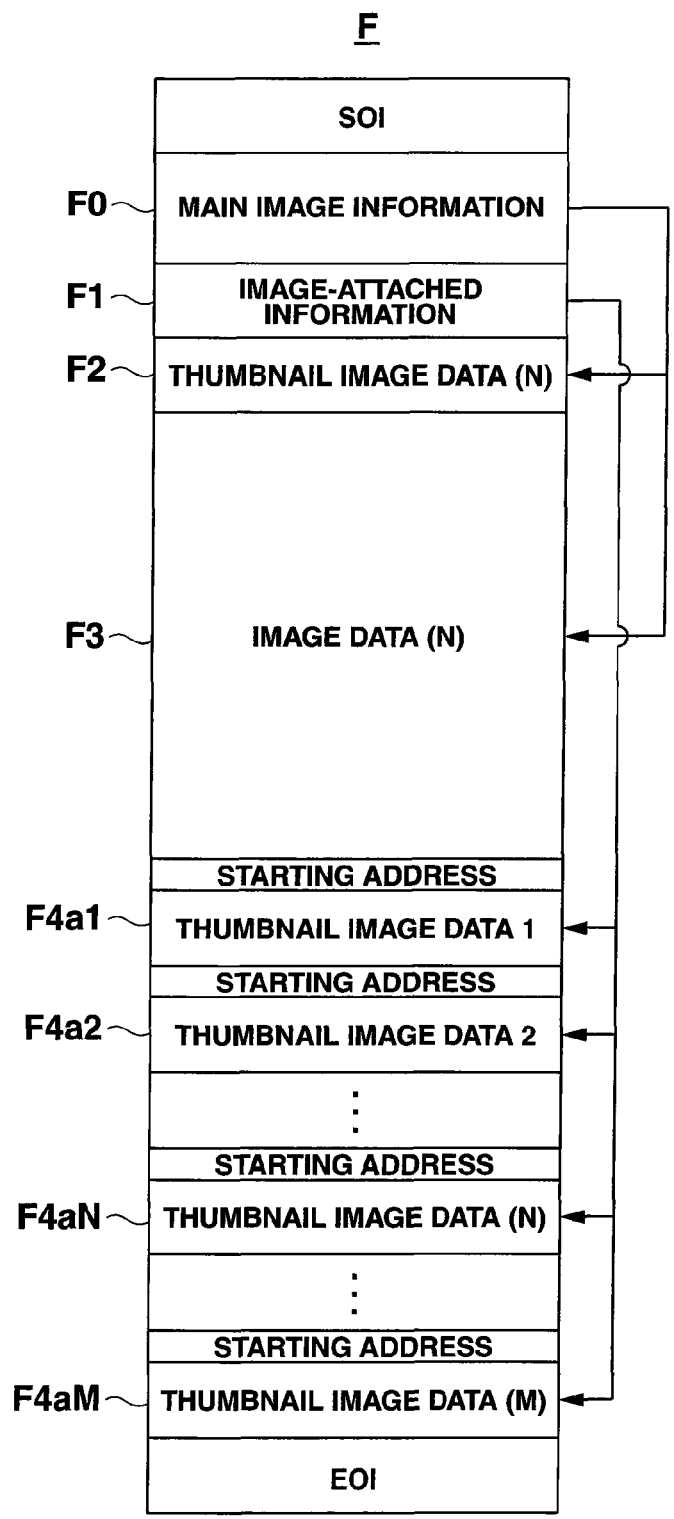
FIG. 4 is a data structure diagram of an image file of the first embodiment.

The image file F has a data structure configured in a predetermined format (for example, exchangeable image file (Exif) format) as shown in FIG. 4. For example, the image file F includes main image information F0, image-attached information F1, thumbnail image data F2, image data F3, and thumbnail image data F4a1, F4a2, . . . .

The main image information F0 stores the image information pertaining to a main image designated by the designating section 4b. To put it concretely, the main image information F0 includes the information, such as the photographing information of the main image, an image size, image parameters, the image size of the thumbnail image generated by reducing the main image, and the address of the main image, for example.

The image-attached information F1 includes the information, such as the image sizes of the plurality of thumbnail images of a plurality of still images, and the starting addresses of the respective thumbnail images.

The thumbnail image data F2 is the image data of the thumbnail image generated by reducing the main image.

The image data F3 is the image data generated by compressing the main image, designated by the designating section 4b, by the image compressing section 4c.

The thumbnail image data F4a1, F4a2, . . . is the image data generated by compressing the respective thumbnail images of a plurality of still images by the image compressing section 4c. To put it concretely, the thumbnail image data F4a1, F4a2, . . . is stored in the predetermined regions in the order of a continuous shooting with the starting addresses related to the respective pieces of the thumbnail image data F4a1, F4a2, . . . .

In addition, the data structure of the image file F is not limited to the one described above, but the other data structures may be adoptable as long as the data structures severally include the main image information F0, the image-attached information F1, the thumbnail image data F2, the image data F3, the thumbnail image data F4a1, F4a2, . . . , and the like.

The record controlling section 8 makes the recording medium 9 record a main image designated by the designating section 4b and a plurality of thumbnail images generated by the reduced image generating section 4a in a predetermined region with the main image related to the thumbnail images.

To put it concretely, when the image file F, including the main image designated by the designating section 4b and the plurality of thumbnail images generated by the reduced image generating section 4a, is generated by the file generating section 7, then the record controlling section 8 makes the recording medium 9 record the image file F in a predetermined region of the recording medium 9.

Hereby, the record controlling section 8 functions as a record controlling section to make the recording medium 9 record a main image designated by the designating section 4b and a plurality of thumbnail images generated by the reduced image generating section 4a with both of them related to each other.

The recording medium 9 is composed of, for example, a nonvolatile memory (flash memory). The recording medium 9 stores image data of a still image coded by the image compressing section 4c, and the like. Furthermore, the recording medium 9 stores the image file F generated by the file generating section 7.

In addition, the recording medium 9 may be an external memory detachably attachable to the imaging apparatus 100, or a built-in memory of the imaging apparatus 100.

The operation inputting section 10 is a section for performing a predetermined operation of the imaging apparatus 100. To put it concretely, as shown in FIG. 5, the operation inputting section 10 includes, for example, a shutter button 10a pertaining to a photographing instruction of a subject, a selection designating button 10b pertaining to a selection and designation of an imaging mode, a function, and the like, determining buttons 10c and 10d, and the like. The inputting section 10 outputs a predetermined operation signal according to an operation of the buttons to the CPU 11.

The CPU 11 controls each section of the imaging apparatus 100. To put it concretely, the CPU 11 performs various control operations in conformity with various processing programs (not shown) for the imaging apparatus 100, which programs are stored in the ROM 12.

Next, the operation processing pertaining to a record controlling method of the imaging apparatus 100 will be described with reference to FIGS. 2 and 3.

Figure 2:
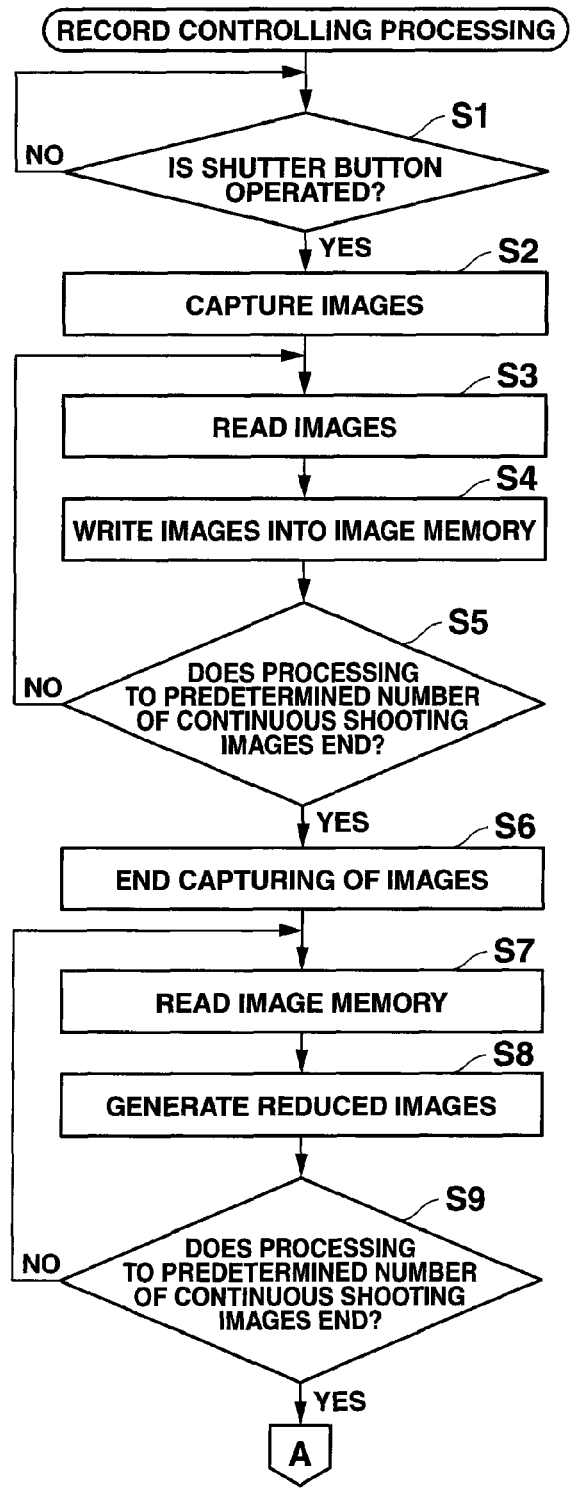
FIG. 2 is a flow chart showing a procedure of a continuous shooting mode of the first embodiment.
Figure 3:
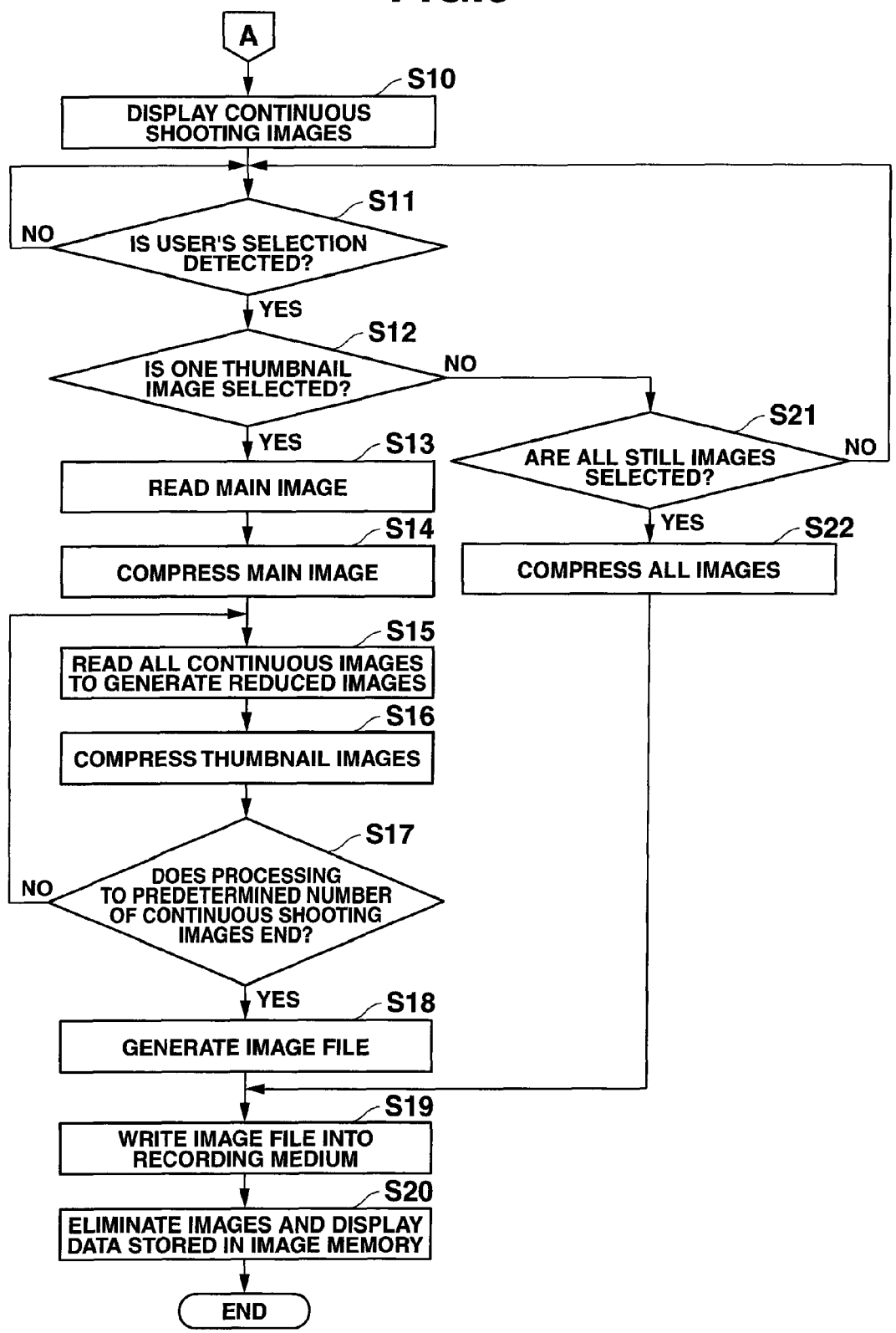
FIG. 3 is a flowchart showing the continuation of the procedure of the continuous shooting mode of FIG. 2.

FIGS. 2 and 3 are flow charts showing an example of an operation pertaining to the record controlling processing of image data.

The record controlling processing is the processing to be executed when a continuous shooting mode is selected and designated among a plurality of imaging modes displayed on a menu screen on the basis of a user's predetermined operations of the selection designating button 10b and the determining buttons 10c and 10d of the operation inputting section 10.

First, as shown in FIG. 2, the imaging section 1 judges whether the shutter button 10a has been operated or not under the control of the CPU 11 (Step S1).

If it is judged here that the shutter button 10a has been operated (Step S1: YES), the imaging section 1 continuously images a predetermined number (for example, 10) of an optical images formed by the lens section 1a, at a predetermined imaging frame rate with the electronic imaging section 1b to capture the continuous shooting images (Step S2). For example, as shown in FIG. 5, the imaging section 1 images a situation in which a dolphin jumps out of the water into the air and then dives into the water again, by a continuous shooting.

In addition, if it is judged that the shutter button 10a has not been depressed (Step S1: NO), the imaging section 1 repeats the judging processing at Step S1 until it is judged that the shutter button 10a has been depressed.

Next, the imaging section 1 reads the continuous shooting images captured into the electronic imaging section 1b (Step S3), and stores the continuous shooting images into the image memory 3 in the order of the imaging (Step S4). Then, the imaging section 1 judges whether the storing of a predetermined number of continuous shooting images has ended or not (Step S5).

The imaging section 1 repeats the processing at Steps S3 and S4 here until it is judged that the storing of the predetermined number of continuous shooting images has ended (Step S5: NO). When it is judged that the storing of the predetermined number of continuous shooting images has ended (Step S5: YES), the imaging section 1 ends the capturing of the continuous shooting images by the electronic imaging section 1b (Step S6).

Next, the reduced image generating section 4a reads the predetermined number of continuous shooting images, temporarily stored in the image memory 3, one by one under the control of the CPU 11 (Step S7), and generates thumbnail images (reduced images) for being displayed in the display section 6 (Step S8). Then, the reduced image generating section 4a judges whether the generation of the respective thumbnail images of the predetermined number of continuous shooting images has ended or not (Step S9).

The reduced image generating section 4a repeats the processing at Steps S7 and S8 here until it is judged that the generation of the respective thumbnail images of the predetermined number of continuous shooting images has ended (Step S9: NO). Then, when the reduced image generating section 4a judges that the generation of the respective thumbnail images of the predetermined number of continuous shooting images has ended (Step S9: YES), then, as shown in FIG. 3, the display controlling section 5 makes the display section 6 display the thumbnail images (for example, thumbnail images H1-H4) generated by the reduced image generating section 4a (Step S10; see FIG. 5). For example, as shown in FIG. 5, the display section 6 displays the predetermined number (for example, 4) of thumbnail images H1-H4 in the order of imaging (for example, the order from left to right in the display section 6) among the respective thumbnail images of a plurality of (for example, 10) continuous shooting images produced by imaging the situation in which the dolphin jumps out of the water into the air and then dives into the water again, by a continuous shooting.

Next, the CPU 11 performs the judgment of whether a user has operated the selection designating button 10b or not (Step S11). Namely, the respective thumbnail images of the plurality of continuous shooting images (for example, 10) are displayed in the display section 6 in the state in which the user can select them. When it is judged in this state that the user has operated the selection designating button 10b (Step S11: YES), the CPU 11 performs the judgment of whether the user has operated the determining button 10d or not, namely the judgment of whether any one of the plurality of thumbnail images has been selected or not (Step S12). To put it concretely, as shown in FIG. 5, when the determining button 10d related to an icon indicating the saving of one still image is operated by the user, the determining button 10d outputs, to the CPU 11, the predetermined signal indicating the saving of the still image corresponding to the thumbnail image (for example, the thumbnail image H2) displayed with the display frame W superimposed thereon. Then, the CPU 11 performs the judgment of whether the still image corresponding to any one of the plurality of thumbnail images has been selected or not (Step S12) on the basis of whether the predetermined signal is detected or not.

Then, when the still image corresponding to any one of a plurality of thumbnail images is selected (Step S12: YES), the image compressing section 4c reads the still image (main image) corresponding to the thumbnail image selected by the user from the image memory 3 (Step S13), and compresses the image data of the main image by, for example, the JPEG system (Step S14).

Next, the reduced image generating section 4a reads a predetermined number of continuous shooting images one by one from the image memory 3, and generates thumbnail images (reduced images) for being saved into the image file F (Step S15).

In addition, the thumbnail images for being displayed, generated at Step S8, may also be used for the saving into the image file F without newly generating thumbnail images here.

Then, the image compressing section 4c compresses the thumbnail images for being saved into the image file F by, for example, the JPEG system (Step S16), and judges whether the compression of the respective thumbnail images of the predetermined number (for example, 10) of continuous shooting images has ended or not (Step S17).

The image compressing section 4c repeats the processing at Steps S15 and S16 here until the compression of the respective thumbnail images of the predetermined number (for example, 10) of continuous shooting images has ended (Step S17: NO). When it is judged that the compression of the respective thumbnail images of the predetermined number of continuous shooting images has ended (Step S17: YES), the file generating section 7 generates one image file F including the compressed image data of the main image corresponding to the thumbnail image selected by the user and the respective compressed thumbnail image data of the predetermined number of continuous shooting images (Step S18).

Then, the record controlling section 8 makes the recording medium 9 record the image file F, generated by the file generating section 7 (Step S19). Furthermore, the reduced image generating section 4a eliminates the image data of the predetermined number of continuous shooting images, stored in the image memory 3 temporarily, the thumbnail image data for being displayed, and the like (Step S20), and ends the record controlling processing.

Furthermore, if no still images corresponding to any of a plurality of thumbnail images have been selected (Step S12: NO), the image compressing section 4c performs the judgment of whether all of the still images corresponding to the plurality of thumbnail images have been selected or not (Step S21). To put it concretely, as shown in FIG. 5, when the determining button 10c related to the icon indicating the saving of all still images is operated by the user, the determining button 10c outputs a predetermined signal instructing the saving of all the still images to the CPU 11. Then, the CPU 11 performs the judgment of whether all of the plurality of still images have been selected or not (Step S21) on the basis of whether the predetermined signal is detected or not.

If all of the plurality of still images have been selected here (Step S21: YES), the image compressing section 4c reads all of the still images corresponding to the respective thumbnail images from the image memory 3, and compresses each piece of the image data of the still images by, for example, the JPEG system (Step S22). Then the record controlling processing proceeds to Step S19. After that, the record controlling section 8 records the image data of the still images, compressed by the image compressing section 4c, in the recording medium 9 (Step S19). Furthermore, the reduced image generating section 4a eliminates the image data of the predetermined number of still images, the thumbnail image data for being displayed, and the like, which are temporarily stored in the image memory 3 (Step S20), and ends the record controlling processing.

As described above, according to the imaging apparatus 100 of the present embodiment, the main image designated among a plurality of still images imaged by a continuous shooting and a plurality of thumbnail images obtained by reducing the plurality of still images can be recorded in the recording medium 9 with both of them related to each other. To put it concretely, a main image designated among the plurality of still images imaged by a continuous shooting and the plurality of thumbnail images obtained by reducing the plurality of still images can be collected into one image file to be recorded in the recording medium 9.

Consequently, it can effectively be prevented that each of the image files of a main image and a plurality of thumbnail images is apart from each other, and the management of image files can easily be performed. Furthermore, because the plurality of thumbnail images can also be read immediately by reading a main image, the situation at the time of photographing the main image can easily be understood by referring to the plurality of thumbnail images.

Furthermore, because any of continuous shooting images desired by a user can be selected as a main image, the recording of the main image can be performed in conformity with the user's intention, and an imaging apparatus having good usability can be provided.

[First Modification]

Next, a first modification of the imaging apparatus 100 of the present embodiment will be described.

Figure 6:
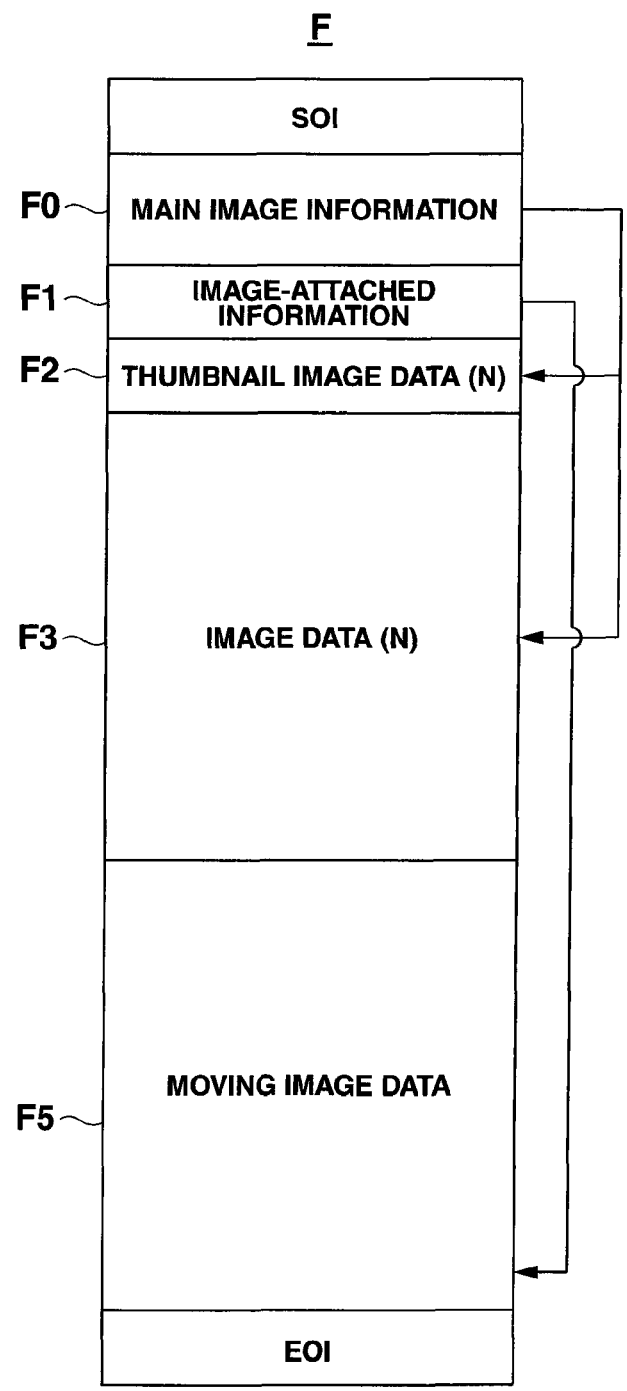
FIG. 6 is a data structure diagram of an image file in a first modification.

FIG. 6 is a data structure diagram of the image file F in the first modification. As shown in FIG. 6, the image file F in the first modification is characterized by storing moving image data F5, generated on the basis of the thumbnail image data F4a1, F4a2, . . . , in place of the thumbnail image data F4a1, F4a2, . . . .

To put it concretely, the image processing section 4 generates a moving image in a predetermined file format (for example, Motion-JPEG system) as a moving image generating section on the basis of the image data of a plurality of thumbnail images generated by the reduced image generating section 4a.

Then, the file generating section 7 makes the image file F include the moving image data F5 of the moving image generated by the image processing section 4 as the image data of the plurality of thumbnail images.

In addition, the configuration of the first modification is almost the same as that of the embodiment described above except the structure of the image file F, the configurations of the image processing section 4 and the file generating section 7, and the detailed description of the configuration is omitted.

Consequently, according to the imaging apparatus 100 of the first modification, it is possible to more effectively understand the situation at the time of photographing the main image by observing a moving image stored to be related to the main image in comparison with the case of referring to a plurality of thumbnail images.

In addition, although the designating section 4b designates the still image corresponding to one thumbnail image selected by a user as the main image in the aforesaid embodiment, the present invention is not limited to this method. It is also possible to designate the main image by automatically specifying any one of a plurality of continuously imaged still images by performing an image analysis with consideration for the conditions of a subject and the conditions of photographing. Furthermore, the imaging apparatus may be configured in such a way that, when the designating section 4b cannot automatically designate one still image, that is, when three still images are automatically selected among ten still images, for example, then a user designates any one of the three still images.

Furthermore, although the designating section 4b is configured to designate any one of a plurality of continuously imaged still images in the aforesaid embodiment, the present invention is not limited to this method. The designating section 4b may be configured to designate a plurality of still images.

Furthermore, although the first modification is configured to generate a moving image on the basis of the image data of the thumbnail images generated by severally reducing a plurality of continuous shooting images imaged by a continuous shooting, the present invention is not limited to this method. A moving image may be generated on the basis of the respective pieces of the still image data of a plurality of continuous shooting images imaged by a continuous shooting.

Furthermore, although the aforesaid embodiment is configured to realize the functions as the reduced image generating section, the designating section, and the record controlling section by the drives of the reduced image generating section 4a, the designating section 4b, and the record controlling section 8, respectively, under the control of the CPU 11, the present invention is not limited to this configuration. The present invention may adopt the configuration of realizing the aforesaid functions by the execution of predetermined programs by the CPU 11.

Namely, the programs including a reduced image generation processing routine, a designation processing routine, and a record controlling processing routine are previously stored in a program memory for storing programs (not shown). Then, the reduced image generation processing routine may allow the CPU 11 to function as the reduced image generating section for generating the respective reduced images of a plurality of still images on the basis of the image data of the plurality of still images, imaged by the imaging section continuously. Furthermore, the designation processing routine may allow the CPU 11 to function as the designating section for designating at least any one of the plurality of still images, imaged by the imaging section continuously, as the main image. Furthermore, the record controlling processing routine may also allow the CPU 11 to function as the record controlling section for making the recording medium 9 record the main image, designated by the designation processing routine, and the plurality of reduced images, generated by the reduced image generation processing routine, with both related to each other.

Second Embodiment

In the following, the second embodiment of the present invention will be described.

Figure 7:
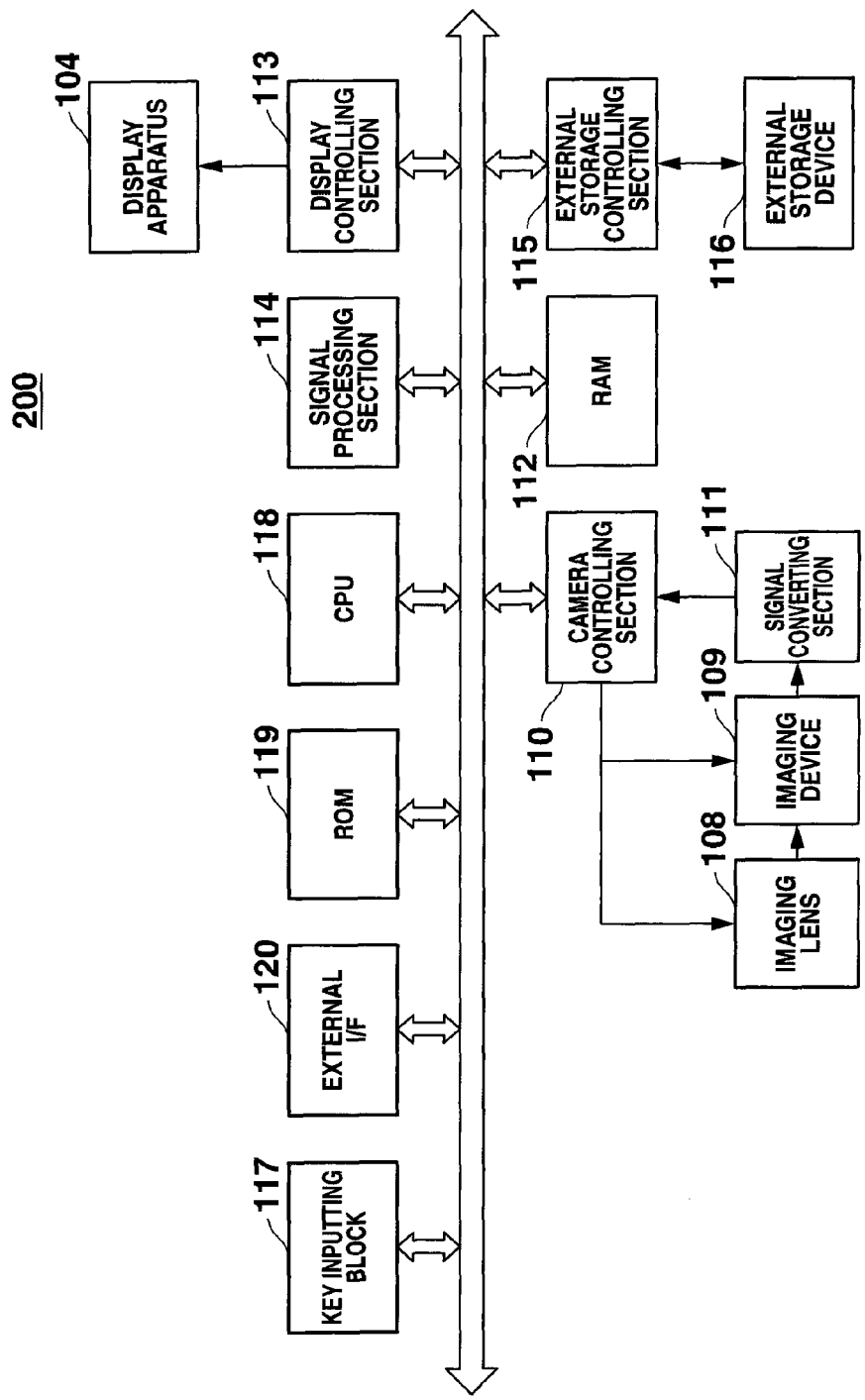
FIG. 7 is a block diagram showing the circuit configuration of an imaging apparatus of a second embodiment of the present invention.

FIG. 7 is a block diagram showing the outline of the electric configuration of an imaging apparatus 200 according to the second embodiment of the present invention. The imaging apparatus 200 has an automatic exposure (AE) function, an auto focus (AF) function, and a continuous shooting function. The imaging apparatus 200 is mainly composed of the following sections. Namely, the imaging apparatus 200 includes an imaging device 109 as an imaging section that electrically converts an optical image of a subject, formed with an imaging lens 108, and that outputs the converted optical image as an imaging signal. The imaging device 109 is driven by a drive signal based on a timing signal generated by a timing generator (TG) included in a camera controlling section 110.

The imaging lens 108 includes a focus lens and a lens motor for moving the focus lens on the optical axis thereof. Then, the position of the focus lens on the optical axis is controlled by the lens motor driven in conformity with an instruction of the camera controlling section 110.

An output signal of the imaging device 109 is converted into a digital signal by an signal converting section 111, equipped with an analog-to-digital (A/D) converter and the like, and after that, the converted digital signal is transmitted to the camera controlling section 110. The camera controlling section 110 makes a random access memory (RAM) 112 store image data after A/D conversion. A signal processing section 114 performs RGB interpolation processing for generating color component data (RGB data) of red (R), green (G), and blue (B) of the image data stored in the RAM 112 of each pixel; YUV conversion processing for generating YUV data from RGB data for each pixel, which YUV data is composed of a luminance signal (Y) and chrominance difference signals (U, V); and digital signal processing for the improvement of image quality, such as auto-white balance (AWB) and edge enhancement.

When the imaging mode is set to a photographing mode, the YUV data stored in the RAM 112 is converted into a video signal by a display controlling section 113 every time the YUV data for one frame is stored in RAM 112, and, after that, the video signals is displayed on a screen as a live view image in a display apparatus 104 (liquid crystal monitor). Then, the image data, stored in the RAM 112 temporarily at the time of photographing, is compressed to be coded by the Joint Photographic Experts Group (JPEG) system in the signal processing section 114, and, after that, the image data is recorded as a still image file in an external storage device 116, composed of, for example, one of various memory cards, through an external storage controlling section 115.

The still image file recorded in the external storage device 116 is suitably read according to a user's selection operation in a reproducing mode, and is expanded in the signal processing section 114 to be developed as YUV data in the RAM 112. After that, the YUV data is displayed as a still image in the display apparatus 104 by the display controlling section 113.

Figure 9:
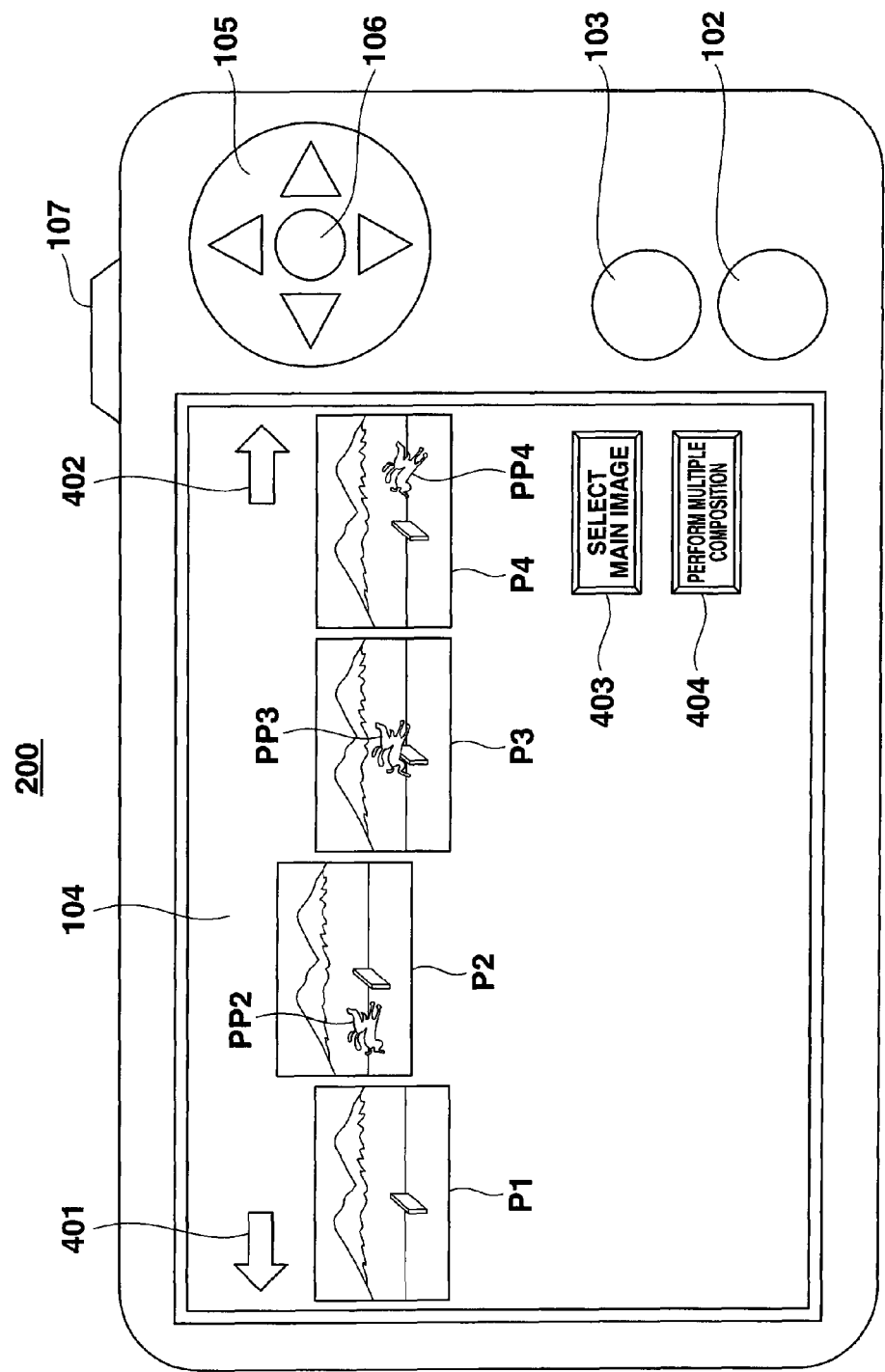
FIG. 9 is a view showing an example of a display state of a display section of the second embodiment.

A key inputting block 117 includes a plurality of keys and buttons, such as a menu key 102, a mode dial 103, a cursor key 105, a SET key 106, and a shutter button 107, shown in FIG. 9, and the operation state of each key and button is monitored at any time by a central processing unit (CPU) 118.

The menu key 102 is operated at the time of making the display apparatus 104 display a menu screen, in which menu items to be selected are displayed, and the mode dial 103 is operated at the time of making the display apparatus 104 display selectable modes, such as a normal photographing mode, a continuous shooting mode, and a reproducing mode.

The cursor key 105 is a key to be operated at the time of designating a menu, an icon, or the like displayed in the display apparatus 104 at the time of menu selecting, mode setting, or the like with a cursor. The cursor key 105 is a seesaw key, on which arrows into four directions are printed. The cursor can be moved into the upper and lower directions or the right and left directions by depressing the arrow parts of the cursor key 105. Furthermore, the SET key 106 is a key to be pushed at the time of selecting and setting an item indicated by the cursor moved with the cursor key 105. Furthermore, the SET key 106 can also be used as an ascertainment key. The shutter button 107 is a key for generating an imaging starting instruction signal in response to a depression.

The CPU 118 performs the control of each section constituting the imaging apparatus 200, an AE control based on the luminance information included in an imaging signal, an AF control by a contrast detecting system, and the like. In addition, various programs necessary for enabling the CPU 118 to perform these controls and various pieces of data necessary for each control are stored in a read only memory (ROM) 119. Furthermore, the ROM 119 also stores set flag information pertaining to various functions of the imaging apparatus 200, the set flag information including the flag information indicating the result of the detection of a user's mode selection operation, and the like.

In addition, a universal serial bus (USB) terminal connecting section is connected to an external interface (I/F) 120.

Figure 8:
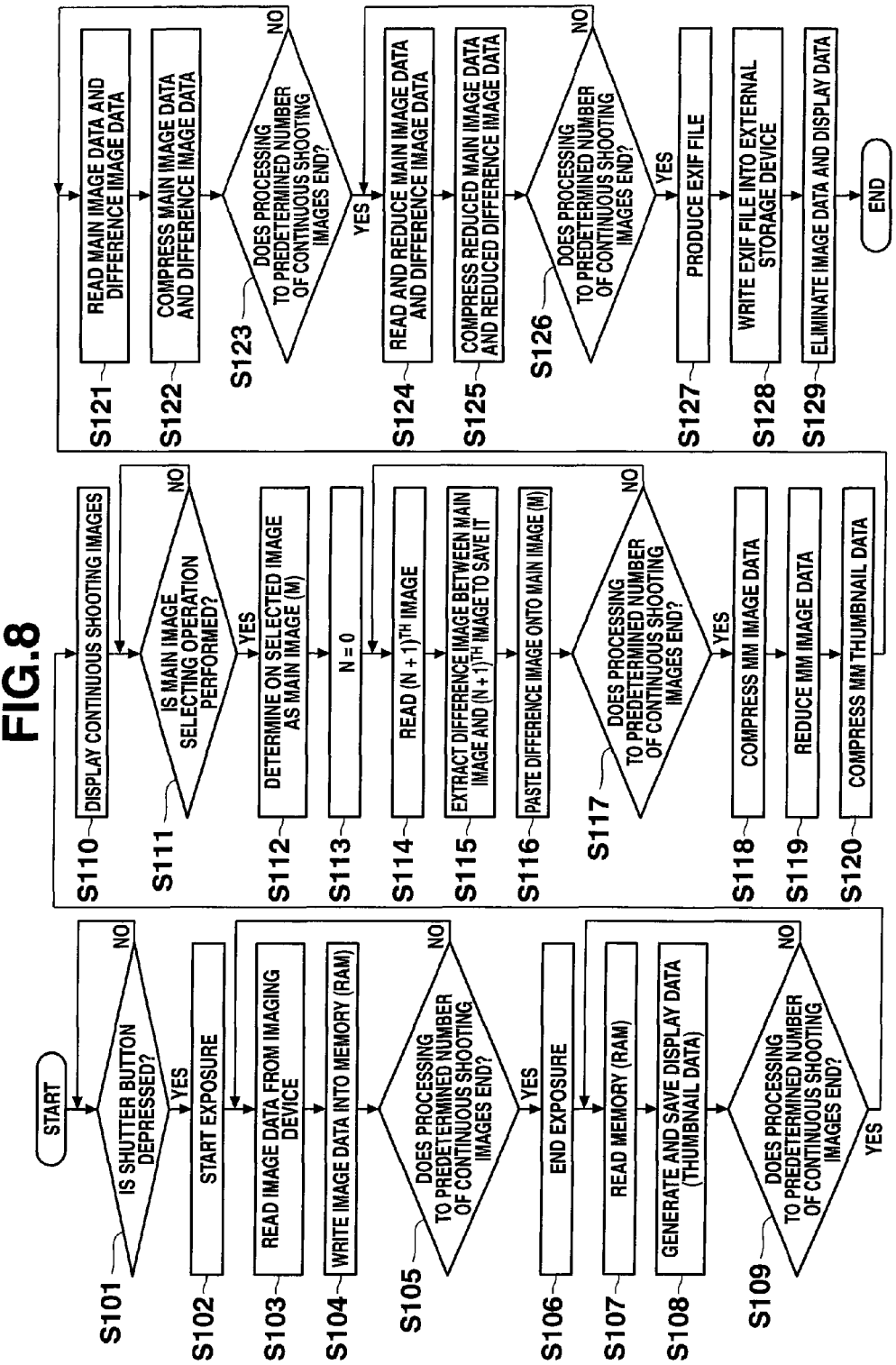
FIG. 8 is a flow chart showing a procedure of a continuous shooting mode of the second embodiment.

In the present embodiment, configured as described above, when a user selects a continuous shooting mode in the menu screen and operates the SET key 106 after the user has operated the menu key 102 to display the menu screen in the display apparatus 104, then the imaging mode is set to the continuous shooting mode. Thereupon, the CPU 118 executes continuous shooting mode processing, the flow chart of which is shown in FIG. 8, on the basis of a program stored in the ROM 119.

Namely, the CPU 118 judges whether the shutter button 107 is depressed or not (Step S101). When a user depresses the shutter button 107 preferably with the imaging apparatus 200 fixed with a tripod or the like, the CPU 118 controls the camera controlling section 110 to start the exposure of the imaging device 109 (Step S102). Successively, the CPU 118 reads the image data generated by the start of the exposure from the imaging device 109 (Step S103), and writes the read image data into the memory (RAM 112) to hold it (Step S104).

Furthermore, the CPU 118 judges whether a predetermined number of continuous shootings (the predetermined number is within a range of, for example, 30-60) has ended or not, namely, whether the holding of the predetermined number of pieces of image data into the RAM 112 has ended or not (Step S105). The CPU 118 repeats the processing at Steps S103 and S104 until the predetermined number of continuous shootings has ended. When the predetermined number of pieces of image data has been held in the RAM 112 by the repetition of the processing (Step S105: YES), the CPU 118 ends the exposure (Step S106).

Hereby, the RAM 112 is in the state of holding the image data of the predetermined number of continuous shootings. In addition, sequence numbers of 1, 2, 3, . . . are attached to each piece of the image data to be sequentially stored in the RAM 112 at this time. Successively, the CPU 118 sequentially reads the pieces of image data of the predetermined number of continuous shootings, which image data is held in the RAM 112 (Step S107). Then, the CPU 118 performs the reduction processing of the read image data, and saves the reduced image data into the RAM 112 as the thumbnail data corresponding to the display image for being displayed in the display apparatus 104 (Step S108).

Furthermore, the CPU 118 judges whether the reduction processing of the pieces of image data of the predetermined number of continuous shootings, which has been held into the RAM 112 at Step S104, has ended or not (Step S109), and repeats the processing at Steps S107 and S108 until the reduction processing of the predetermined number of pieces of image data has ended. Hence, when the reduction processing of the predetermined number of pieces of image data has ended and the judgment at Step S109 becomes YES, then the RAM 112 is in the state of saving the thumbnail data of the predetermined number of continuous shootings.

Thereupon, the CPU 118 reads the thumbnail data from the RAM 112, and controls the display controlling section 113 to display the continuous shooting images based on the respective thumbnail data in the display apparatus 104 (Step S110). By the processing at Step S110, as shown in FIG. 9, parts of images P1, P2, P3, and P4 among the continuous shooting images based on the respective thumbnail data are displayed in the display apparatus 104 in the order of time series.

Furthermore, at the time of display processing at Step S110, the CPU 118 makes the display apparatus 104 also display a left direction arrow 401, a right direction arrow 402, a main image selection button 403, a multiple composite button 404, and the like as shown in FIG. 9. Then, when the left direction arrow 401 is selected by the operations of the cursor key 105 and the SET key 106, the CPU 118 executes the processing of making the display apparatus 104 perform the scroll display of the continuous shooting images into the left direction. When the right direction arrow 402 is selected, the CPU 118 executes the processing of making the display apparatus 104 perform the scroll display of the continuous shooting images into the right direction. Hence, by the scroll displays, all the images of the continuous shooting can be displayed in the display apparatus 104 having a limited display area.

Furthermore, the CPU 118 also executes the processing of making an image, for example, an image P2, selected with the operations of the cursor key 105 and the SET key 106, be displaced to an upper position than the other images P1, P3, and P4, and the like in the display processing at Step S110. Hereby, a user can clearly sight the selected image in distinction from the other images.

Next, the CPU 118 judges whether a user's main image selecting operation has been performed or not (Step S111). The main image is an image to be used as a standard at the time of extracting a difference image, which will be described below, and the difference between the main image and another image is the difference image. Furthermore, main image data is the image data indicating the main image, and difference image data is the image data indicating the difference image.

Furthermore, the main image selecting operation is the operation of designating the main image selection button 403 in the state of selecting any image displayed in the display apparatus 104. Hence, if a user designates the main image selection button 403 in the state of selecting an image P1 shown in FIG. 9, which image P1 includes only a background, then the processing proceeds from that at Step S111 to that at Step S112, and the image P1, including only the background, is determined as a main image M.

Next, a counted value N is reset to "0" in order to designate a comparison object image to be an object of the comparison with the main image (Step S113). Furthermore, the CPU 118 increments the counted value N to read an $(N+1)^{th}$ image, sequentially stored into the RAM 112 at Step S104, from the RAM 112 by the use of the incremented counted value (Step S114).

At the time of reading the image from the RAM 112, however, the CPU 118 sequentially reads the $(N+1)^{th}$ image among the residual images except the main image determined at Step S112.

Successively, the CPU 118 extracts a difference image between the read $(N+1)^{th}$ image and the main image M, and saves the difference image data indicating the difference image into the RAM 112 (Step S115). Furthermore, the CPU 118 pastes the extracted difference image to the main image M (Step S116).

Furthermore, the CPU 118 judges whether the difference image extracting processing and the difference image pasting processing to the images of the predetermined number of continuous shootings (except the main image however), held into the RAM 112 at Step S104, have ended or not (Step S117), and repeats the processing at steps S114-S116 until the processing to the predetermined number of image data has ended.

Hence, as shown in FIG. 9, a difference image PP2 is extracted from the imaged image P2, by the processing at Step S115 at a first time; a difference image PP3 is extracted from the imaged image P3, by the processing at Step S115 at a second time; a difference image PP4 is extracted from the imaged image P4, by the processing at Step S115 at a third time.

Figure 10:
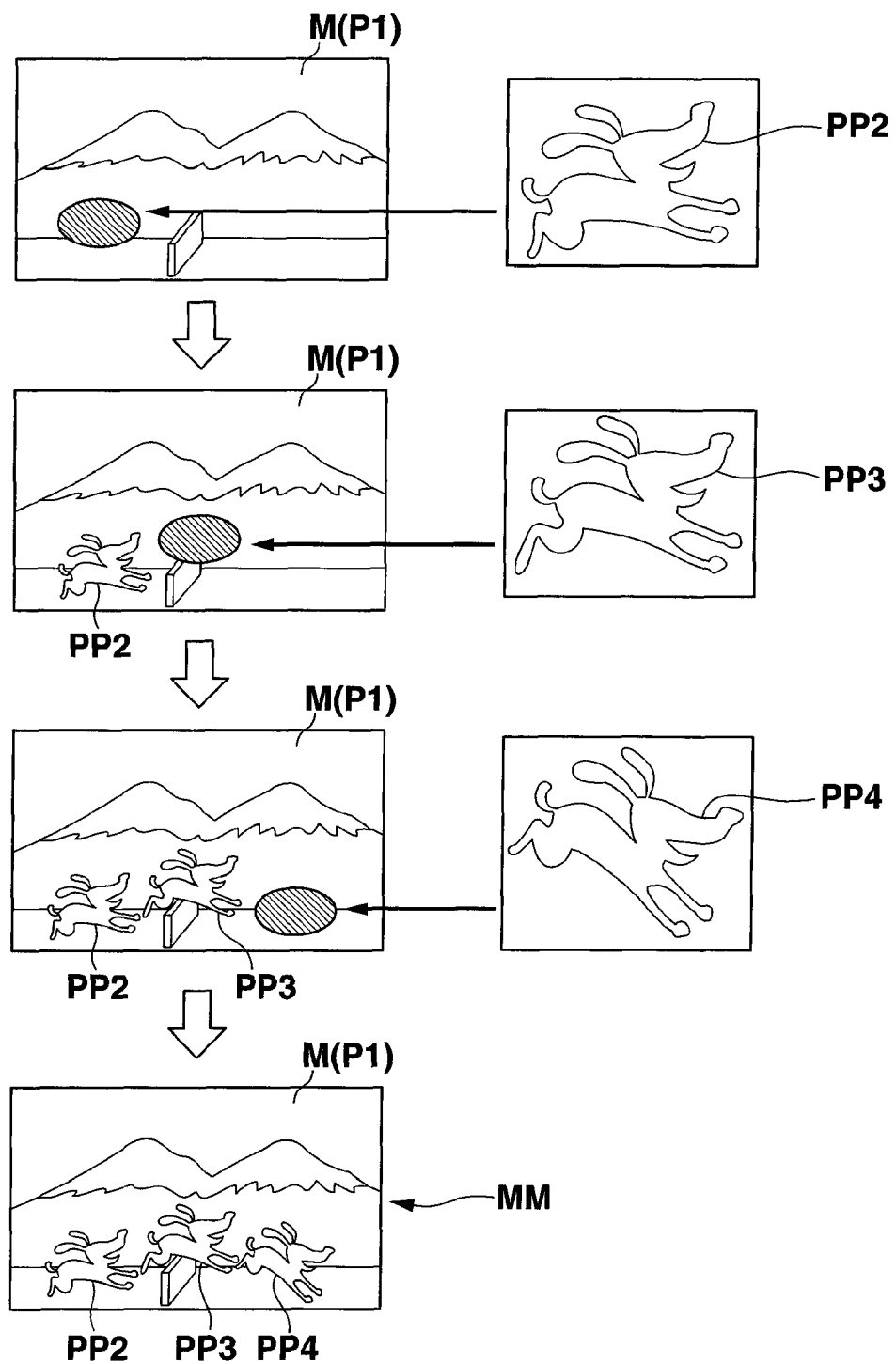
FIG. 10 is an explanatory view showing a procedure of multiple composition.

Furthermore, the difference image PP2 is pasted to the main image M (imaged image P1) by the processing at Step S116 at a first time, as shown in FIG. 10; the difference image PP3 is further pasted to the main image M, to which the difference image PP2 has been pasted, by the processing at Step S116 at a second time, as shown in FIG. 10; furthermore the difference image PP4 is pasted to the main image M, to which the difference images PP2 and PP3 have been pasted, by the processing at Step S116 at a third time, as shown in FIG. 10.

Hereby, as shown in FIG. 10, a multiple composite image MM, in which the difference images PP2, PP3, and PP4 are pasted to the main image M (imaged image P1) is generated in the RAM 112.

Then, when the CPU 118 has ended the difference image extracting processing and the difference image pasting processing to the predetermined number of images and the judgment at Step S117 becomes YES, the CPU 118 compresses the image data of the multiple composite image MM (Step S118). Furthermore, the CPU 118 performs the reduction processing of the multiple composite image MM to generate the MM thumbnail data, which is the thumbnail data of the multiple composite image MM (Step S119). Then, the CPU 118 performs the compression processing of the MM thumbnail data (Step S120).

Successively, the CPU 118 reads the main image data and the difference image data (Step S121), and performs the compression processing of the image data of these main image and difference images (Step S122). Furthermore, the CPU 118 judges whether the compression processing of the image data of the predetermined number of continuous shooting images held in the RAM 112 at Step S104 has ended or not (Step S123), and repeats the processing at Steps S121 and S122 until the processing to the predetermined number of pieces of image data has ended.

Furthermore, when the compression processing of the main image data and the difference image data corresponding to the predetermined number of continuous shootings has ended in this manner (Step S123: YES), the CPU 118 reads the main image data and the difference image data to perform their reduction processing (Step S124). Then, the CPU 118 performs the compression processing of the main image thumbnail data and the difference image thumbnail data (Step S125).

Furthermore, the CPU 118 judges whether the compression processing of the thumbnail image data of the predetermined number of continuous shooting images, held in the RAM 112 at Step S104, has ended or not (Step S126), and repeats the processing at Steps S124 and S125 until the processing to the predetermined number of pieces of image data has ended.

Hence, when the judgment at Step S126 becomes YES and the processing has ended, at least the following data [1]-[6] is saved in the RAM 112 in its compressed state:

[1] "MM image data": the image data of the multiple composite image MM compressed by the processing at Step S118;

[2] "MM thumbnail data": the image data of the MM thumbnail compressed by the processing at Step S120;

[3] "main image data": the image data of the main image compressed by the processing at Step S122;

[4] "difference image data": the image data of the difference images compressed by the processing at Step S122;

[5] "main image thumbnail data": the image data of the main image thumbnail compressed by the processing at Step S125; and

[6] "difference image thumbnail data": the image data of the difference image thumbnails compressed by the processing at Step S125.

Then, when the judgment at Step S126 becomes YES and the processing has ended, an exchangeable image file format (Exif) file is produced by the use of the data [1]-[6] (Step S127).

Figure 11:
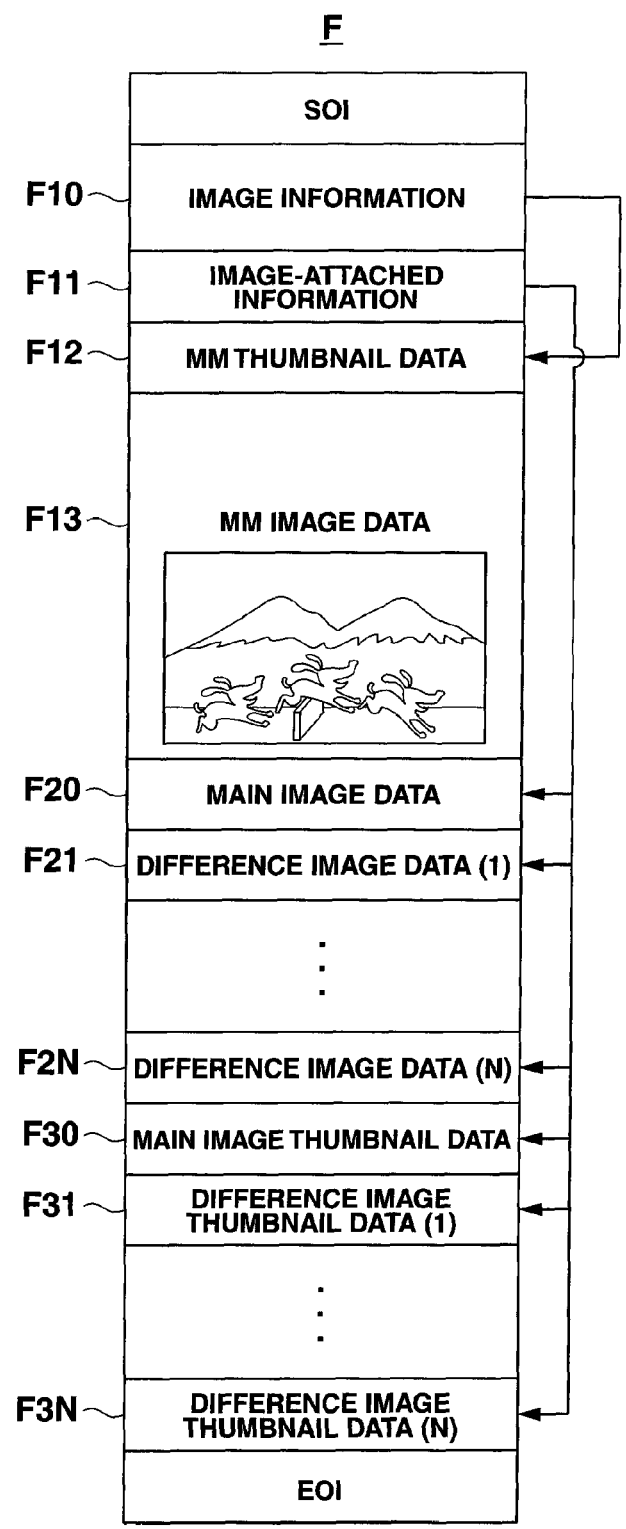
FIG. 11 is a data structure diagram of an image file of the second embodiment.

By the processing at Step S127, as shown in FIG. 11, the Exif file F composed of the following content is produced:
image information F10,
image-attached information F11,
MM thumbnail data F12,
MM image data F13,
main image data F20,
difference image data (1) F21 to difference image data (N) F2N,
main image thumbnail data F30, and
difference image thumbnail data (1) F31 to difference image thumbnail data (N) F3N.

Among the respective pieces of data constituting the Exif file F, the image information F10 is the information pertaining to the MM thumbnail data F12, and is the information of photographing information, an image size, image parameters, and the like. The image-attached information F11 is the information pertaining to the main image data F20, the difference image data (1) F21 to (N) F2N, the main image thumbnail data F30, and the difference image thumbnail data (1) F31 to (N) F3N, and is the information including an image size, the address of each image, and the like pertaining to the aforesaid information.

After that, the CPU 118 writes the produced Exif file F into the external storage device 116 through the external storage controlling section 115 (Step S128). Furthermore, because the image data and the display data in the RAM 112 becomes unnecessary owing to the production of the Exif file F and the writing thereof into the external storage device 116, the CPU 118 eliminates the image data and the display data from the RAM 112 (Step S129), and ends the processing.

Hence, because the Exif file F is saved in the external storage controlling section 115, a user can freely use the Exif file F, saved in the external storage controlling section 115, in the future. Consequently, a multiple composite image, in which a subject image continues with arbitrary changes to enable a user to precisely understand the transition of the movement of the subject, can be produced by pasting difference images arbitrarily selected to the main image, the number of selected difference images being less than the total number N, among the main image, corresponding to the main image data F20, and the respective difference images, corresponding to the difference image data (1) F21 to (N) F2N.

Furthermore, a user can enjoy a multiple composite image in the display apparatus 104 by reproducing the MM image data F13 and the MM thumbnail data F12 according to a designation operation to the multiple composite button 404.

Furthermore, it is also possible to perform the thumbnail display of a sequentially changing subject in the display apparatus 104 by using the difference image thumbnail data (1) F31 to (N) F3N, and the user can hereby clearly sight the individual movements of the subject.

In addition, although the thumbnail data of the difference images is recorded in the present embodiment, the imaging apparatus 200 may be configured to further record the thumbnail data of each image itself obtained by a continuous shooting. By configuring the imaging apparatus 200 in this manner, even if a reproduction apparatus is not provided with the function of combining main image thumbnail data and difference image thumbnail data to generate thumbnail data, the image based on the thumbnail data of continuous shooting images can be reproduced, and the utility values of the continuous shooting images can hereby be enhanced.

Furthermore, although the compression processing of main image data and difference image data is performed after the processing of the compression processing of MM thumbnail data at the processing at Steps S118-S122 in the present embodiment, the compression processing of the MM thumbnail data may be performed after the compression processing of the main image data and the difference image data.

According to one aspect of the preferred embodiments of the present invention, there is provided an imaging apparatus 100, including, an imaging section 1 to image a subject continuously, a reduced image generating section 4a to perform predetermined image processing to a plurality of pieces of image data imaged by the imaging section 1 continuously, a designating section 4b to designate a piece of image data as main image data among the plurality of pieces of image data, and a recording medium 9 to record the plurality of pieces of image data subjected to the predetermined image processing, and the main image data, as one image file F.

The entire disclosures of Japanese Patent Applications No. 2009-178679 filed on Jul. 31, 2009 and No. 2010-060096 filed on Mar. 17, 2010 including descriptions, claims, drawings, and abstracts are incorporated herein by reference in their entirety.

Although various exemplary embodiments have been shown and described, the invention is not limited to the embodiments shown. Therefore, the scope of the invention is intended to be limited solely by the scope of the claims that follow.

What is claimed is:
1. An imaging apparatus comprising:
an imaging section to continuously image a subject;
an image processing section to perform predetermined image processing on a plurality of pieces of still image data continuously imaged by the imaging section;
a designating section that is operable by a user to designate a piece of still image data selected by the user as main still image data among the plurality of pieces of still image data continuously imaged by the imaging section;

a file generating section to generate one still image file which includes the main still image data designated by the user and the plurality of pieces of still image data on which the image processing has been performed; and a recording control section to control a recording medium to record the one still image file;

wherein any one of the plurality of pieces of still image data on which the image processing has been performed are displayable without an interpolation which uses the plurality of pieces of still image data, when said any one of the plurality of pieces of still image data is selected to be displayed.

2. An imaging apparatus comprising:

an imaging section to continuously image a subject;

an image processing section to perform predetermined image processing on a plurality of pieces of still image data continuously imaged by the imaging section;

a designating section that is operable by a user to designate a piece of still image data selected by the user as main still image data among the plurality of pieces of still image data continuously imaged by the imaging section;

a file generating section to generate one still image file which includes the main still image data designated by the user and the plurality of pieces of still image data on which the image processing has been performed; and a recording control section to control a recording medium to record the one still image file;

wherein the one still image file includes the designated main still image data on which the predetermined image processing has not been performed, and the plurality of pieces of still image data on which the image processing has been performed including a piece of still image data corresponding to the designated main still image data.

3. An imaging apparatus comprising:

an imaging section to continuously image a subject;

an image processing section to perform predetermined image processing on a plurality of pieces of still image data continuously imaged by the imaging section;

a designating section that is operable by a user to designate a piece of still image data selected by the user as main still image data among the plurality of pieces of still image data continuously imaged by the imaging section;

a file generating section to generate one still image file which includes the main still image data designated by the user and the plurality of pieces of still image data on which the image processing has been performed; and a recording control section to control a recording medium to record the one still image file;

wherein the one still image file includes the designated main still image data on which the predetermined image processing has not been performed, and the plurality of pieces of still image data on which the image processing has been performed and which do not include a piece of still image data corresponding to the designated main still image data.

4. An image recording method, comprising:

performing predetermined image processing on a plurality of pieces of continuously imaged still image data;

designating, by an operation of a user, a piece of still image data selected by the user as main still image data among the plurality of pieces of continuously imaged still image data;

generating one still image file which includes the main still image data designated by the user and the plurality of pieces of still image data on which the image processing has been performed; and controlling a recording medium to record the one still image file;

wherein any one of the plurality of pieces of still image data on which the image processing has been performed are displayable without an interpolation which uses the plurality of pieces of still image data, when said any one of the plurality of pieces of still image data is selected to be displayed.

5. An image recording method, comprising:

performing predetermined image processing on a plurality of pieces of continuously imaged still image data;

designating, by an operation of a user, a piece of still image data selected by the user as main still image data among the plurality of pieces of continuously imaged still image data;

generating one still image file which includes the main still image data designated by the user and the plurality of pieces of still image data on which the image processing has been performed; and controlling a recording medium to record the one still image file;

wherein the one still image file includes the designated main still image data on which the predetermined image processing has not been performed, and the plurality of pieces of still image data on which the image processing has been performed including a piece of still image data corresponding to the designated main still image data.

6. An image recording method, comprising:

performing predetermined image processing on a plurality of pieces of continuously imaged still image data;

designating, by an operation of a user, a piece of still image data selected by the user as main still image data among the plurality of pieces of continuously imaged still image data;

generating one still image file which includes the main still image data designated by the user and the plurality of pieces of still image data on which the image processing has been performed; and controlling a recording medium to record the one still image file;

wherein the one still image file includes the designated main still image data on which the predetermined image processing has not been performed, and the plurality of pieces of still image data on which the image processing has been performed and which do not include a piece of still image data corresponding to the designated main still image data.

7. The imaging apparatus according to claim 1, wherein the image processing section performs reduction processing on the plurality of pieces of still image data.

8. The imaging apparatus according to claim 1, wherein the image processing section extracts difference image data indicating differences between the main still image data and the plurality of pieces of still image data not designated as the main still image data based on the main still image data and the plurality of pieces of still image data not designated as the main still image data.

9. The imaging apparatus according to claim 8, further comprising:

a generating section to generate one piece of composite image data by combining the difference image data extracted by the image processing section, and the main still image data, wherein the file generating section generates the one still image file which includes the main still image data, the composite image data, and the difference image data.

10. The imaging apparatus according to claim 7, further comprising:
    a display controlling section to control a display section to display reduced still image data subjected to the reduction processing by the image processing section; and
    a selecting section that is operable by the user to select at least any one piece of reduced still image data among the reduced still image data displayed in the display section,
    wherein the designating section is operable by the user to designate the still image data corresponding to the reduced still image data selected by the user via the selecting section, as the main still image data among the plurality of pieces of still image data.

11. The imaging apparatus according to claim 1, wherein the one still image file further includes image-attached information about the plurality of pieces of still image data.

12. The imaging apparatus according to claim 2, wherein the image processing section performs reduction processing on the plurality of pieces of still image data.

13. The imaging apparatus according to claim 2, wherein the image processing section extracts difference image data indicating differences between the main still image data and the plurality of pieces of still image data not designated as the main still image data based on the main still image data and the plurality of pieces of still image data not designated as the main still image data.

14. The imaging apparatus according to claim 13, further comprising:
    a generating section to generate one piece of composite image data by combining the difference image data extracted by the image processing section, and the main still image data,
    wherein the file generating section generates the one still image file which includes the main still image data, the composite image data, and the difference image data.

15. The imaging apparatus according to claim 12, further comprising:
    a display controlling section to control a display section to display reduced still image data subjected to the reduction processing by the image processing section; and
    a selecting section that is operable by the user to select at least any one piece of reduced still image data among the reduced still image data displayed in the display section,
    wherein the designating section is operable by the user to designate the still image data corresponding to the reduced still image data selected by the user via the selecting section, as the main still image data among the plurality of pieces of still image data.

16. The imaging apparatus according to claim 2, wherein the one still image file further includes image-attached information about the plurality of pieces of still image data.

17. The imaging apparatus according to claim 3, wherein the image processing section extracts difference image data indicating differences between the main still image data and the plurality of pieces of still image data not designated as the main still image data based on the main still image data and the plurality of pieces of still image data not designated as the main still image data.

18. The imaging apparatus according to claim 17, further comprising:
    a generating section to generate one piece of composite image data by combining the difference image data extracted by the image processing section, and the main still image data,
    wherein the file generating section generates the one still image file which includes the main still image data, the composite image data, and the difference image data.

19. The imaging apparatus according to claim 3, further comprising:
    a display controlling section to control a display section to display reduced still image data subjected to reduction processing by the image processing section; and
    a selecting section that is operable by the user to select at least any one piece of reduced still image data among the reduced still image data displayed in the display section,
    wherein the designating section is operable by the user to designate the still image data corresponding to the reduced still image data selected by the user via the selecting section, as the main still image data among the plurality of pieces of still image data.

20. The imaging apparatus according to claim 3, wherein the one still image file further includes image-attached information about the plurality of pieces of still image data.

* * * * *